(No Model.)

C. E. ALDEN.
ADJUSTABLE GEAR.

No. 369,221. Patented Aug. 30, 1887.

WITNESSES
Will H. Powell.
A. A. Connolly.

INVENTOR
Chas. E. Alden,
By Connolly Bros.
Attorneys.

UNITED STATES PATENT OFFICE.

CHARLES E. ALDEN, OF PHILADELPHIA, PENNSYLVANIA.

ADJUSTABLE GEAR.

SPECIFICATION forming part of Letters Patent No. 369,221, dated August 30, 1887.

Application filed November 13, 1886. Serial No. 218,787. (No model.)

*To all whom it may concern:*

Be it known that I, CHARLES E. ALDEN, a citizen of the United States, residing at Philadelphia, in the county of Philadelphia and State of Pennsylvania, have invented certain new and useful Improvements in Adjustable Gearing for Chains and Belts; and I do hereby declare the following to be a full, clear, and exact description of the invention, reference being had to the accompanying drawings, which form part of this specification, in which—

Figure 1:
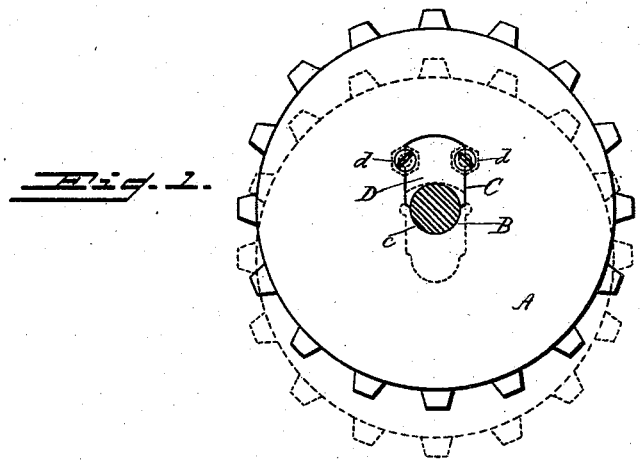
Figure 3:
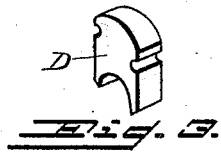
Figure 2:
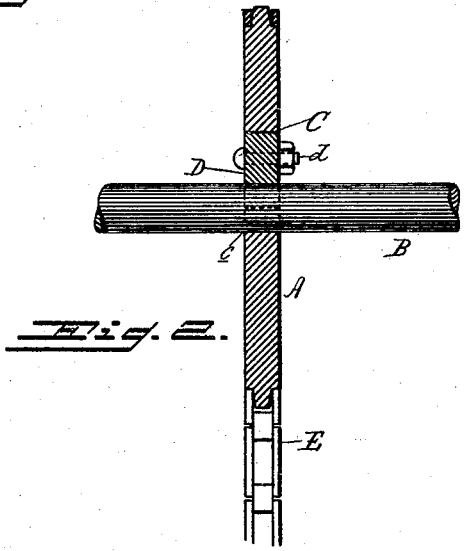

Figure 1 is a side elevation of wheel and shaft, the full lines indicating the concentric and the dotted lines the eccentric position of the shaft, the latter being in cross-section. Fig. 2 is a vertical section on line $x$ $x$ of Fig. 1, the shaft being shown in elevation. Fig. 3 is a perspective of insertible block.

My invention has for its object to provide means for facilitating the application of drive chains and belts to and their removal from sprocket-wheels.

My improvements consist, essentially, in the peculiar construction of a sprocket-wheel, whereby it may be moved laterally on its spindle or shaft and fastened in its properly-adjusted position.

In the use of drive chains and belts, and particularly in the case of separable drive-chains, difficulty is experienced in applying the same to and removing them from the wheels over which they run and in adjusting them so as to avoid slack, these difficulties being largely due to the facts that the wheels are immovable laterally on their shafts or spindles, and that it is necessary in applying a drive-chain to allow some slack in order to couple the final links or link and coupling. To remedy these difficulties I make the sprocket-wheel with a slot or recess leading into the central opening which receives the shaft or spindle, whereby the wheel may be laterally moved eccentric to the shaft or spindle to take up or to allow slack, (according to the direction of lateral movement of said wheel,) and I provide a block or insertible and detachable piece, which may be fastened in place to hold the wheel or pulley concentric with the shaft.

Referring to the accompanying drawings, A designates a sprocket-wheel to which my improvements are applied, and B a shaft or spindle on which said wheel is mounted. Said wheel has a central opening for the shaft or spindle, and this opening is the end of or leads into a slot, C. When the shaft touches the end $c$ of the slot or side of the opening, the wheel is concentric with said shaft; but when said wheel is moved laterally away from said end or side $c$ it becomes eccentric to the shaft, a portion of its periphery being thus brought nearer to said shaft and to the other or fellow wheel, over which the chain or belt runs. This permits or produces slack in the chain E or in a belt in the same position, permitting its easy application to or removal from the wheel.

In putting on a chain or belt the wheel occupies the eccentric position relatively to the shaft, as shown in dotted lines in Fig. 1 of the drawings. After putting on the chain or belt the wheel is moved laterally until it occupies the concentric position shown in full lines in said figure, which takes up, wholly or partly, the slack of the chain or belt. A block or sectional piece, D, is then inserted in the slot C and fastened therein by screws $d$ $d$ or equivalent securing device. This piece should be withdrawn when it is desired to move the wheel to the eccentric position.

What I claim as my invention is—

1. A sprocket-wheel having an unbroken periphery and having a slotted shaft-opening, and a part, as D, which fits said opening, whereby such wheel may be moved laterally to an eccentric position on a shaft or spindle and also held in a concentric position thereon.

2. The combination, with a shaft or spindle, B, of a sprocket-wheel, A, having an unbroken periphery, and a slot, C, which leads into a central shaft-opening, and an insertible and removable piece, D, which fits in said slot and holds said wheel in its concentric position, substantially as shown and described.

In testimony that I claim the foregoing I have hereunto set my hand this 8th day of October, 1886.

CHARLES E. ALDEN.

Witnesses:
CHARLES OTTO,
DAVID BUIST.